(12) United States Patent
Antreich et al.

(10) Patent No.: US 7,997,636 B2
(45) Date of Patent: Aug. 16, 2011

(54) DEVICE AND METHOD FOR ACTUATING AN OPENABLE VEHICLE ROOF SYSTEM

(75) Inventors: Michael Antreich, Germering (DE); Markus Gross, Raisting (DE); Christof Morscheit, Munich (DE)

(73) Assignee: Webasto AG, Stockdorf (DE)

( * ) Notice: Subject to any disclaimer, the term of this patent is extended or adjusted under 35 U.S.C. 154(b) by 425 days.

(21) Appl. No.: 12/096,137

(22) PCT Filed: Dec. 7, 2006

(86) PCT No.: PCT/DE2006/002187
§ 371 (c)(1),
(2), (4) Date: Aug. 12, 2008

(87) PCT Pub. No.: WO2007/076768
PCT Pub. Date: Jul. 12, 2007

(65) Prior Publication Data
US 2008/0315633 A1    Dec. 25, 2008

(30) Foreign Application Priority Data
Dec. 9, 2005    (DE) .......................... 10 2005 058 921

(51) Int. Cl.
*B60J 7/12* (2006.01)
(52) U.S. Cl. ............................... 296/107.01; 296/107.09
(58) Field of Classification Search ............. 296/107.01, 296/112, 115, 117, 107.09
See application file for complete search history.

(56) References Cited

U.S. PATENT DOCUMENTS

| | | | | |
|---|---|---|---|---|
| 5,067,768 A | * | 11/1991 | Fischbach | 296/107.08 |
| 5,666,873 A | * | 9/1997 | Lindmayer et al. | 91/511 |
| 5,724,878 A | * | 3/1998 | Stolle et al. | 91/165 |
| 6,267,432 B1 | * | 7/2001 | Stolle | 296/107.01 |
| 6,832,806 B2 | * | 12/2004 | Mentink et al. | 296/115 |
| 7,118,160 B2 | * | 10/2006 | Willard | 296/107.01 |
| 7,194,947 B2 | * | 3/2007 | Mentink | 91/420 |
| 7,413,235 B2 | * | 8/2008 | Pausch et al. | 296/107.01 |
| 7,464,980 B2 | * | 12/2008 | Gutendorf et al. | 296/107.01 |
| 7,494,175 B2 | * | 2/2009 | Condon et al. | 296/110 |
| 2001/0015127 A1 | | 8/2001 | Osterried | |

FOREIGN PATENT DOCUMENTS

DE    10219513    1/2003

OTHER PUBLICATIONS

International Search Report dated May 14, 2007.

* cited by examiner

*Primary Examiner* — Glenn Dayoan
*Assistant Examiner* — Gregory Blankenship
(74) *Attorney, Agent, or Firm* — Fitch, Even, Tabin & Flannery; John M. Naber

(57) ABSTRACT

The invention relates to the actuation of an openable roof system, for example of a cabriolet canopy system, in which a synchronized adjusting phase (Ts) is provided during the adjustment (t0 to t3) for opening and/or closing the vehicle roof system, in which synchronized adjusting phase (Ts) a first hydraulic actuator and a second hydraulic actuator are hydraulically coupled for the synchronized movement (s1, s2) of two components of the vehicle roof system. In order to increase operational reliability, in particular to reduce the risk of undesired collisions of the components, the invention provides monitoring of the synchronized movement (s1, s2) of the two components during the synchronized adjusting phase (Ts), and in the event of a deviation of the synchronized movement (s1, s2) from a predefined nominal synchronized movement being detected, correction of the synchronized movement by at least partially suspending the hydraulic coupling of the two hydraulic actuators.

5 Claims, 5 Drawing Sheets

DEVICE AND METHOD FOR ACTUATING AN OPENABLE VEHICLE ROOF SYSTEM

Figure 1:
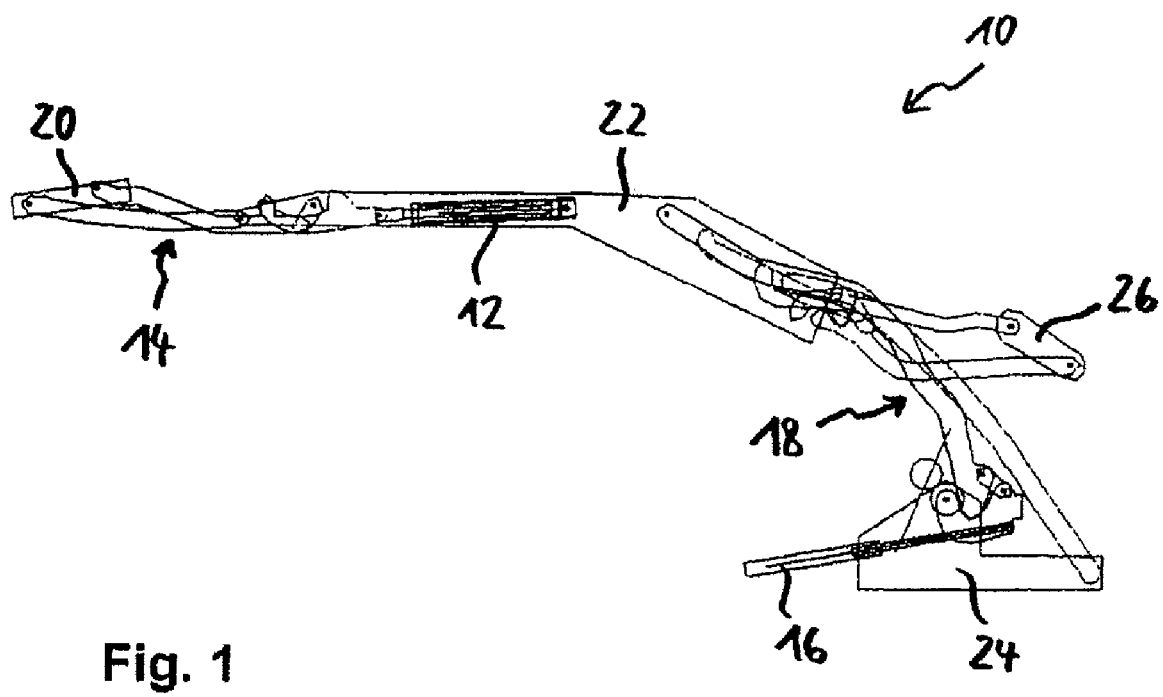

This application is a 35 U.S.C. §371 National Stage entry of PCT/DE2006/002187, filed Dec. 7, 2006, which claims priority from German Patent Application No.: DE 10 2005 058 921.9, filed Dec. 9, 2005, the contents of which are herein incorporated by reference.

The present invention relates to a device and to a method for actuating a vehicle roof system according to the precharacterizing clause of claim 1.

A device of this type and a method of this type are known, for example, from DE 102 19 513 A1. This publication describes a convertible top system for a vehicle, in which at least two hydraulically movable components are provided, for example a convertible top and a covering cap of a convertible top storage space. For the displacement of the convertible top of the vehicle, it can be provided that, during the sequence of movement, first of all a first actuator is in operation, then the first actuator and a second actuator are connected in series and therefore operate synchronously, and finally the second actuator continues its movement while the first actuator is secured in a final position.

Although the "synchronous displacement" of a plurality of components that is provided in the second phase advantageously enables an overall rapid and elegant sequence of movement for the displacement of the convertible top, this embodiment conceals the not inconsiderable risk of an undesirable collision of components of the convertible top system with one another or with other components of the vehicle bodywork.

In the case of the convertible top system described in DE 102 19 513 A1 mentioned above, it has to be taken into consideration, for example, that the actuators, which are designed as hydraulic cylinders, and the linkage mechanisms moved by them are in practice affected by tolerances. In addition, undesirable leakages which, during the operation, may impair the synchronization which is theoretically predetermined by the hydraulic coupling of the two actuators may occur in the general hydraulic system.

It is therefore an object of the present invention to increase the operational reliability upon the actuation of a vehicle roof system of the type mentioned at the beginning, in particular to reduce the risk of undesirable collisions of individual vehicle roof components or vehicle body components.

This object is achieved by an actuating device as claimed in claim 1.

The basic concept of the invention consists in monitoring the component movement that takes place during the synchronous displacement phase and of correcting it if appropriate. Deviations, which are caused in particular by tolerances or operating errors (for example leakages), in the synchronous movement from the movement theoretically already predetermined by the type and manner of hydraulic coupling can advantageously therefore be detected and eliminated during the displacement operation.

The actuating device according to the invention comprises:
monitoring means for monitoring the synchronous movement of the two components during the synchronous displacement phase and for detecting a deviation of the synchronous movement from a predetermined desired synchronous movement, and
correcting means for correcting the synchronous movement by at least partially suspending the hydraulic coupling of the two actuators in the event of a deviation of the synchronous movement from the predetermined desired synchronous movement being detected.

In a preferred embodiment, the monitoring means comprise an electronic control device to which sensor signals of a travel and/or angle of rotation sensor system, which is arranged on the two actuators and/or the two components of the vehicle roof system, are input for evaluation.

The electronic control device can be in particular a device conventionally referred to as an ECU ("electronic control unit"). An electronic control device of this type, in particular with program control, is particularly suitable within the context of the invention for realizing the required monitoring and correction functionality.

With regard to the actual sequence of movement of the components of the vehicle roof system being depicted as precisely as possible by means of a sensor system provided for this purpose, in very general terms fitting of suitable sensors in the region of the components themselves or in the region between the components and the actuators in question (for example in the form of angle of rotation sensors on an actuating joint) is preferred. The sensor system can be realized, for example, in one of the following ways (or a combination thereof):

by means of linear travel sensors on hydraulic cylinders (actuators), said sensors detecting the current piston position of the respectively assigned hydraulic cylinder, by means of a device via which the rotational movement of a mechanism linkage is passed to a linear sensor, by means of angle of rotation sensors which are positioned advantageously or in the best possible manner on a mechanism linkage in order to optimally detect the respective movements.

The evaluation of sensor signals which are provided for the monitoring means takes place under program control in a preferred embodiment.

In one embodiment, it is provided that the monitoring means compare an actual movement parameter of the second component with a desired movement parameter of the second component, which desired movement parameter is generated on the basis of an actual movement parameter of the first component, and activate the correcting means as soon as the difference between the actual movement parameter and the desired movement parameter of the second component leaves a predetermined tolerance range. In the simplest case, the movement parameter can be a parameter which characterizes the spatial position of the component in question at a particular moment (with reference to the position of another vehicle roof system component or vehicle body component), such as, for example, a displacement travel recorded by a sensor system and/or a displacement angle of rotation. However, it should not be ruled out that, as an alternative or an addition, a temporal derivative of such a position parameter, such as, for example, a linear velocity or rotational velocity, is used for the evaluation.

The tolerance range predetermined for a selected movement parameter can be delimited by one or more tolerance thresholds lying above a desired value and/or by one or more tolerance thresholds lying below the desired value. The specification of a plurality of tolerance thresholds in a direction of deviation affords the advantage, for example, that the possibly required correction to the synchronous movement can be matched to the extent of the deviation detected. In a development, it can be provided that the monitoring means determine the extent of a possible deviation substantially continuously and the correcting means take said extent into consideration for the correction of the synchronous movement.

In one embodiment, it is provided that the width of the tolerance range mentioned above varies over the synchronous movement range of the displacement. Account is therefore advantageously taken of the fact that, as a rule, only certain regions within the displacement operation are to be considered particularly critical with regard to the operating reliability whereas other movement phases are comparatively uncritical. In such cases, the predetermined tolerance range for more critical movement phases may be smaller than for other portions of the movement.

In one embodiment, the monitoring means comprise a look-up table which is stored in electronic form and assigns a desired movement parameter of the second component to an actual movement parameter of the first component. As an alternative or in addition, an upper and/or a lower tolerance threshold for the movement parameter can be assigned here to the second component.

The invention is suitable in particular for actuating vehicle roof systems in which a particularly rapid displacement is required for opening and/or closing the vehicle roof and, for this purpose, at least two components of the vehicle roof system are to be moved simultaneously (in relation to each other and/or with respect to the vehicle body) in at least one displacement phase. This may involve, for example, classic fabric convertible top systems with a plurality of actuating bow mechanisms and also "retractable hard tops". Within the context of the invention, not only the components which, in the closed state of the system, form the roof, but also in principle all of the components moving during the displacement should be considered components of the vehicle roof system. This therefore includes, for example, even a "convertible top compartment cover" in the rear region of the vehicle in question.

In one embodiment, at least one of the hydraulic actuators is designed as a hydraulic cylinder in which a housing interior is divided by means of a piston, which is arranged such that it is movable to and fro, into two working chambers which each have a connection for the supply and removal of hydraulic fluid (double-action hydraulic cylinder). In the case of a hydraulic cylinder of this type, the movement of the piston is transmitted by a piston rod, which is connected to said piston and is guided in a manner such that it is sealed to the outside, to the component in question (for example movement or displacement mechanism for a roof panel). As an alternative, a hydraulic actuator can also be formed, for example, by a "hydraulic oscillating motor" by means of which a pivoting movement can be directly produced.

Any hydraulic actuator can be connected in a manner known per se to the component in question of the vehicle roof system, for example to a roof part in the form of a panel or a movement mechanism therefor (for example a four-bar linkage).

Of course, the synchronous displacement of two actuators that, in the case of the invention, takes place at least temporarily during the displacement operation does not rule out the vehicle roof system also comprising further actuators, whether likewise temporarily hydraulically coupled to another actuator (and then preferably likewise monitored in the manner explained above and corrected if appropriate) or independently of the two above-described actuators.

In addition, one or both of the actuators monitored in their synchronous displacement and corrected if appropriate can be provided more than once in a manner known per se and can be operated in a parallel hydraulic connection, for example in duplicate, e.g. on the left and right of the vehicle.

In one embodiment, it is provided that at least one of the two components of the vehicle roof system constitutes a movement mechanism for the forcibly coupled movement of at least two roof system parts which are accordingly moved by means of an actuator (or a pair of actuators connected in parallel).

In one embodiment, it is provided that the first component is moved by the first actuator relative to the second component which, in turn, is moved by another actuator, in particular the second actuator, relative to a vehicle body or to the vehicle bodywork.

In a preferred embodiment, it is provided that the actuating device comprises a pump with a delivery connection and a suction connection connected to a reservoir for hydraulic fluid, wherein the hydraulic passage is designed as a hydraulic line arrangement which can be connected either to the delivery connection of the pump or to the reservoir via an activatable valve device for the at least partial suspension of the hydraulic coupling.

The "hydraulic coupling" of the first actuator and of the second actuator is present when the actuation of the one actuator by means of hydraulic fluid flowing via the connecting hydraulic passage brings about or influences the actuation of the other actuator. Said hydraulic coupling can be "complete" in the sense that a volume of fluid flowing out of the first actuator is supplied via the connecting hydraulic passage in identical form to the second actuator (or vice versa). The hydraulic coupling can be partially suspended by hydraulic fluid being supplied to the hydraulic passage or being removed therefrom during the synchronous displacement phase. In this case, the movement of the one actuator does not only depend on the movement of the other actuator. The hydraulic coupling is "completely suspended" if the configuration of the hydraulic system at a particular moment means that the movement of the one actuator does not exert a direct influence on the movement of the other actuator.

A valve device used for supplying hydraulic fluid to or removing it from the hydraulic passage can be activated in a suitable manner in order to correct the synchronous movement. For this purpose, the valve device can have, for example, one or more suitably arranged directional control valves, for example in order to bring about the abovementioned connection of the hydraulic passage to a delivery connection of the pump or to the reservoir, with said connection, in the simplest case, taking place without the interconnection of a "throttle". In one development, it can be provided that the connection of the hydraulic passage to the delivery connection of the pump or to the reservoir is produced via a throttle arrangement, if appropriate via a throttle arrangement which can be set corresponding to the desired extent of the correction. As an alternative or in addition, the valve device can comprise at least one "proportional valve" in order advantageously to permit, for example, a continuous correction of the synchronous movement when it deviates from the desired sequence of movement.

In one embodiment of the invention, the pumping direction of the pump of the hydraulic system can be switched over. Such a switching over can be used both for an opposite action upon the hydraulic actuators in order to open and close the vehicle roof system and also for the correction provided according to the invention during the synchronous displacement phase.

In the event of a correction of the synchronous movement going wrong for whatever reason, one development of the invention makes provision for a decision which is taken by the actuating device as to whether the vehicle roof system then continues to be operated in the opening direction or in the closing direction (or not at all), said decision being dependent on the position taken up at a particular moment by the vehicle roof system components.

Figure 5:
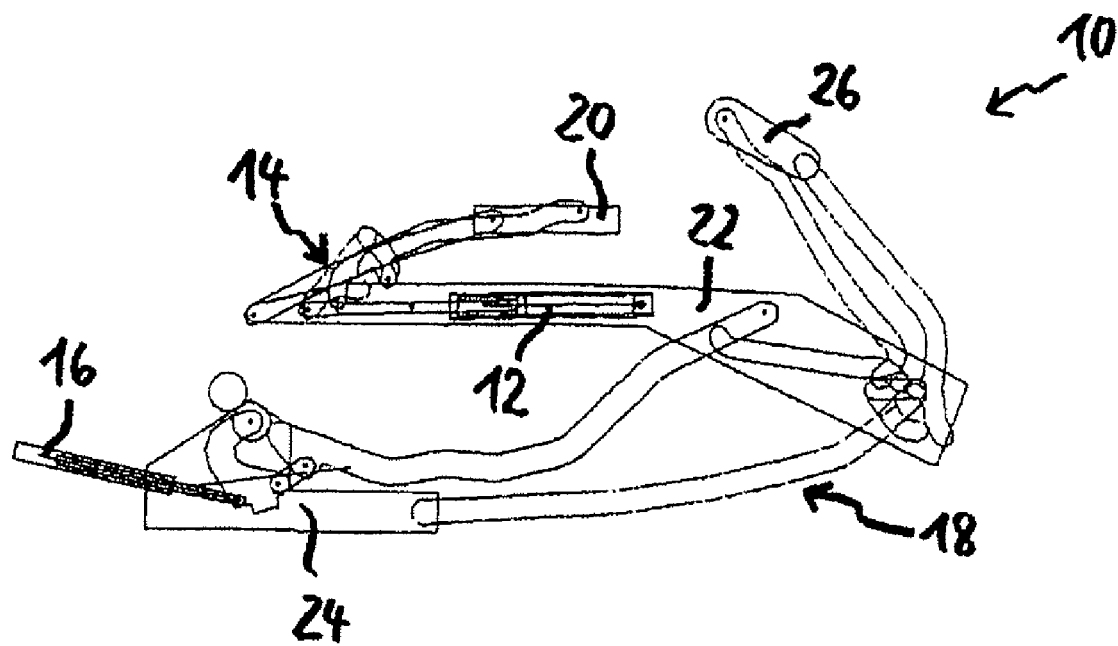
Figure 6:
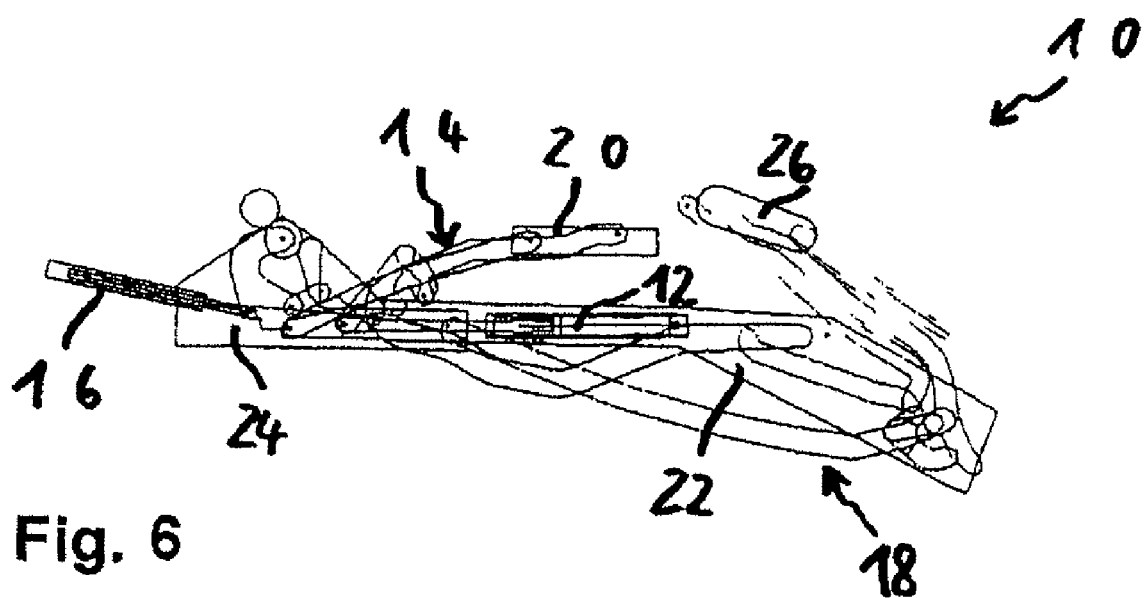
Figure 7:
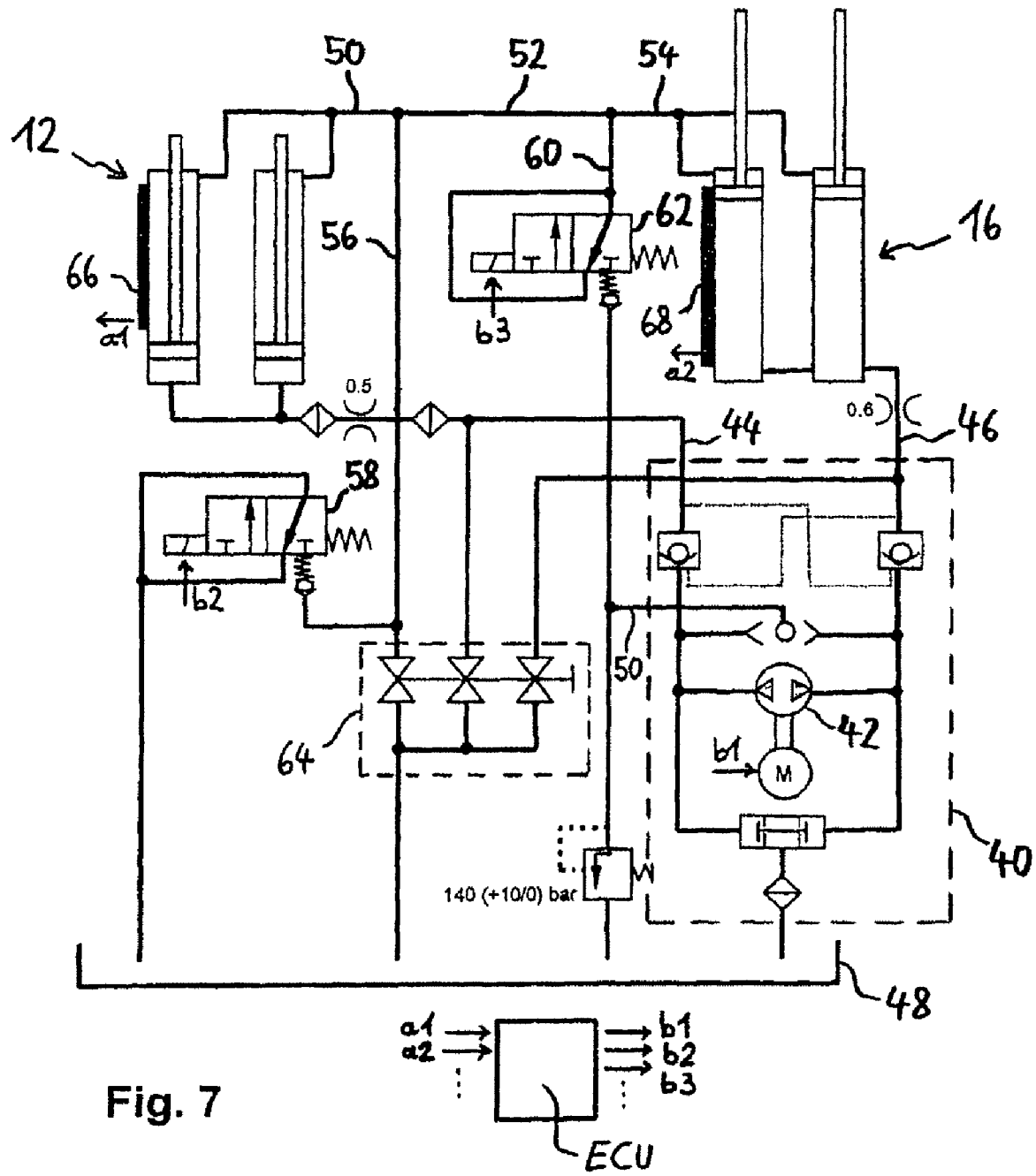
Figure 8:
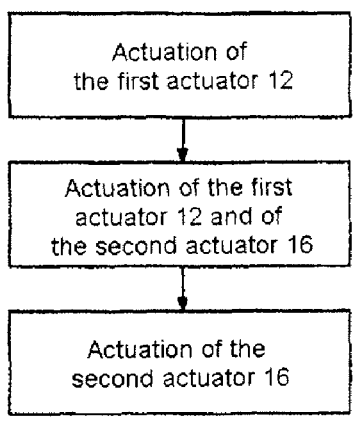
Figure 9:
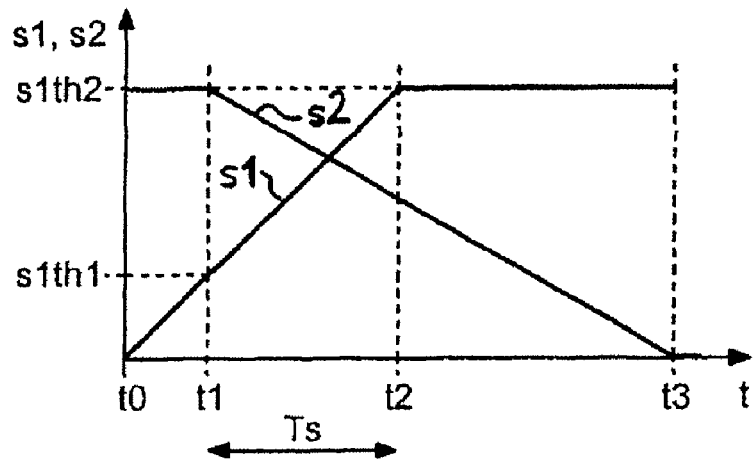
Figure 10:
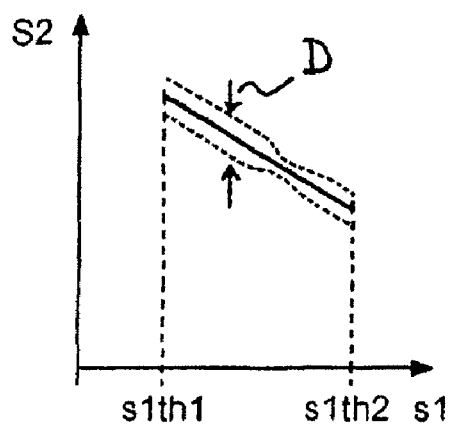

The invention is explained in more detail below using an exemplary embodiment and with reference to the attached drawings, in which:

FIGS. 1 to 6 illustrate schematic side views of the actuating mechanism of a convertible top in various actuation positions, FIG. 1 illustrating the closed position, FIGS. 2 to 5 illustrating various intermediate stages, and FIG. 6 illustrating the open position of the convertible top, FIG. 7 is an illustration of a hydraulic system used for actuating the convertible top of FIGS. 1 to 6, FIG. 8 is a flow diagram for illustrating the opening operation of the convertible top for the convertible top of FIGS. 1 to 6, FIG. 9 illustrates the time profiles of actuator strokes for realizing the opening operation of the convertible top as per FIG. 8, and FIG. 10 is a diagram for illustrating the coordination of the actuator actuation during a synchronous displacement phase in FIG. 9.

FIGS. 1 to 6 show various positions in this sequence of a convertible top 10, starting from a closed position (FIG. 1) to an open position (FIG. 6), wherein, for the sake of simplicity of the illustration, only convertible top parts which are essential for understanding the invention are illustrated. In addition, the parts actually provided twice (on the left and right of the vehicle) can only be seen once in the figures.

The convertible top 10 comprises a first hydraulic cylinder (first hydraulic actuator) 12 for moving a first movement mechanism 14 and a second hydraulic cylinder (second hydraulic actuator) 16 for moving a second movement mechanism 18.

The two movement mechanisms 14, 18 are each essentially designed as a four-bar linkage arrangement. The mechanism 14 located at the front in the longitudinal direction of the vehicle supports a front roof panel (not illustrated) pivotably relative to a central roof panel (not illustrated) of the convertible top 10. The front roof panel and the central roof panel are fastened here to a front panel support 20 and to a central panel support 22, respectively. The front panel support 20 forms the connector of the first four-bar linkage arrangement 14 which can be displaced by the first actuator 12 which is supported for this purpose on the central panel support 22.

The second movement mechanism 18 likewise comprises a four-bar linkage arrangement which permits the central panel support 22 to be pivoted in relation to a stationary base 24 fixed on the vehicle. The second actuator 16 which acts on the second movement mechanism 18 is supported for this in a manner mounted on the vehicle.

Finally, the convertible top system 10 comprises a rear panel support 26 which is connected to a rear roof panel (not illustrated) and constitutes the connector of a further four-bar linkage arrangement which forms a forcibly coupled part of the rear mechanism 18.

FIG. 1 shows the convertible top 10 in a closed position covering the vehicle interior. The piston rod of the first actuator 12 is in the fully retracted state and the piston rod of the second actuator 16 is in the fully extended state.

In order to displace the convertible top 10, starting from the closed position illustrated in FIG. 1, so as to open the convertible top, only the first actuator 12 is actuated (extended) in a first phase and therefore the first movement mechanism 14 and the front roof panel moved.

Figure 2:
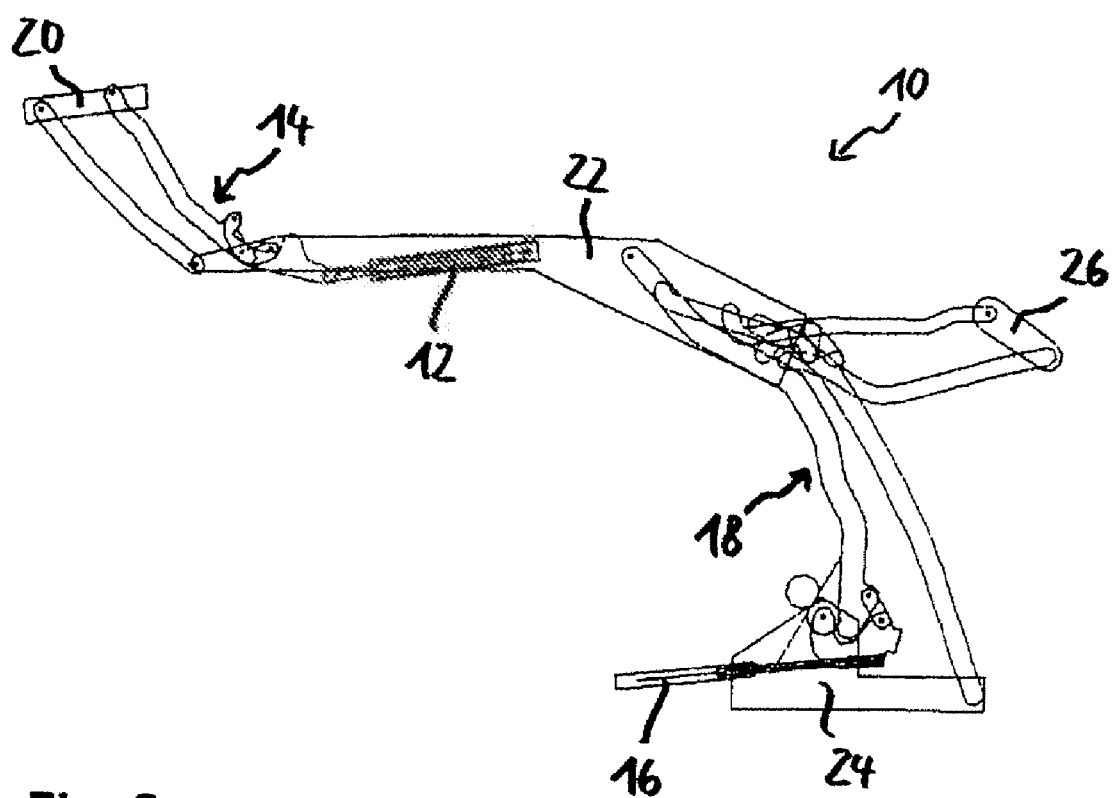
Figure 3:
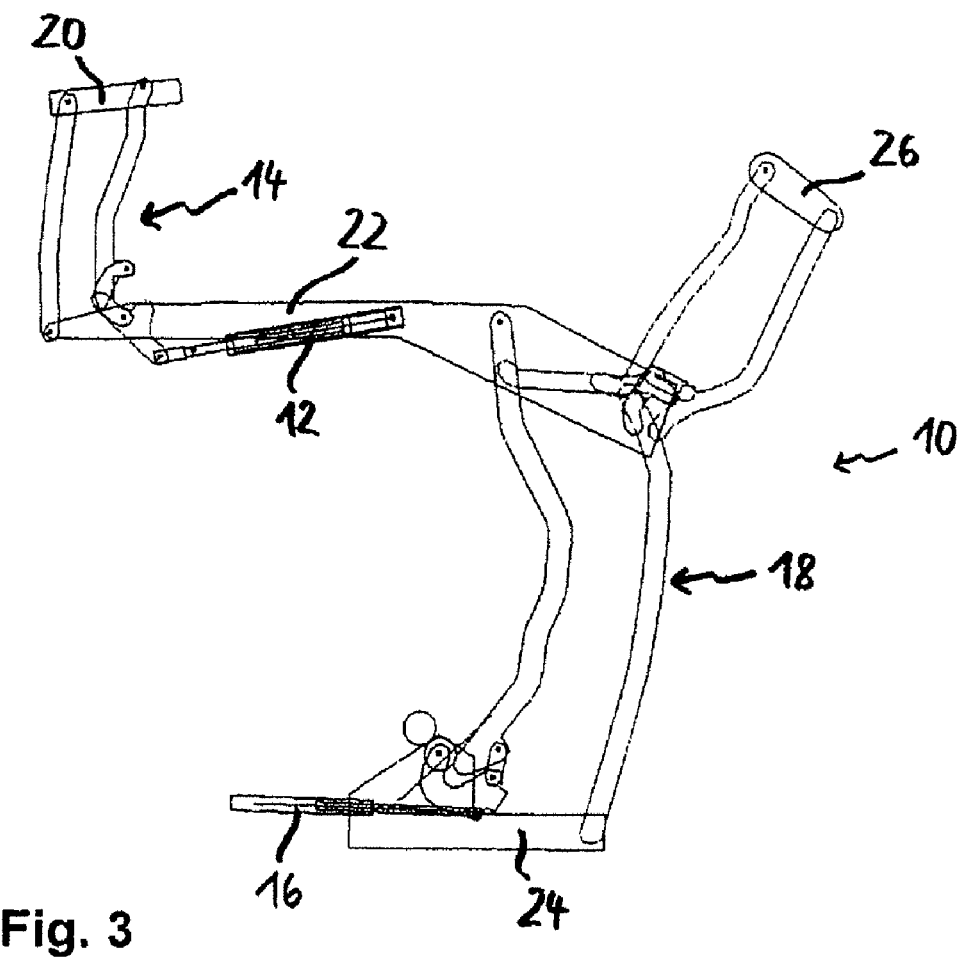
Figure 4:
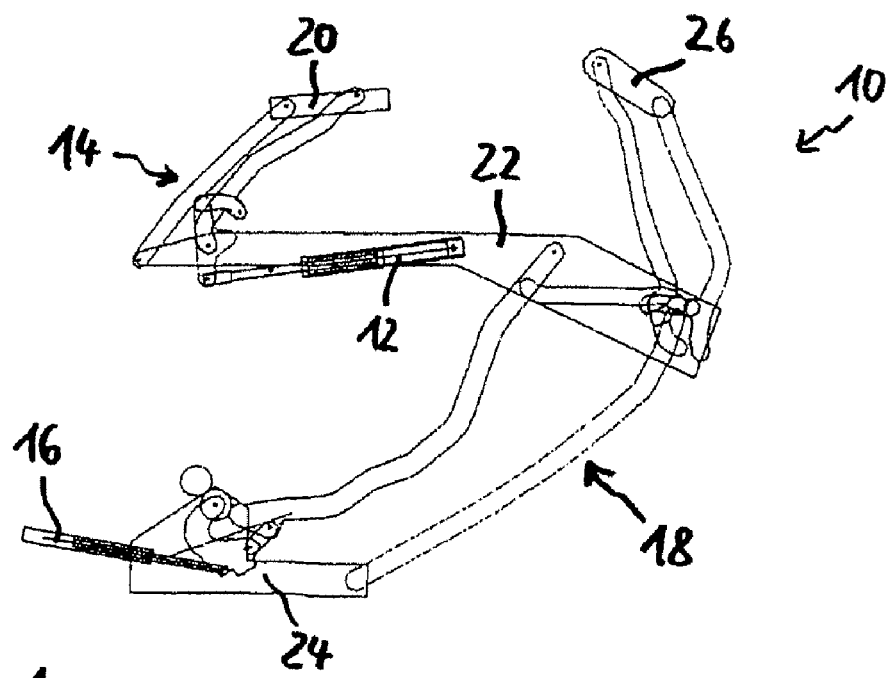

Approximately when the state illustrated in FIG. 2 is reached, in addition the second actuator 16 for pivoting the second movement mechanism 18 is actuated (retracted). A second phase, which is also referred to as the "synchronous displacement phase", in which the two actuators 12 and 16 are actuated simultaneously (cf. FIGS. 2 to 5), therefore begins.

When the state illustrated in FIG. 5 is reached, the synchronous displacement phase is ended. The piston rod of the first actuator 12 is in the fully extended state. Only the second actuator 16 is then still actuated, the piston rod of which is not yet fully retracted in the state according to FIG. 5.

Finally, the state illustrated in FIG. 6 is therefore reached, in which the convertible top system 10 takes up its open position opening up the vehicle interior. The roof panels (not illustrated) are then deposited one above another in a convertible top compartment at the rear. The closing operation of the convertible top takes place with a reverse sequence of movement.

FIG. 7 is a hydraulic circuit diagram in which the integration of the actuators 12 and 16, which are realized in each case in duplicate (on the left and right of the vehicle), in a hydraulic system can be seen.

The hydraulic system comprises a pump subassembly 40 which has a hydraulic pump 42 which is operated by an electric motor (activation signal b1) and the pumping direction of which can be switched over. As is easily apparent from the circuit diagram of FIG. 7, the pump subassembly 40 makes it possible, depending on the pumping direction selected, to subject one of two hydraulic lines 44, 46 to hydraulic pressure and to connect the other of the two lines 44, 46 in an essentially unpressurized manner to a reservoir 48 for hydraulic fluid. Furthermore, the pump subassembly 40 comprises a line 50 which is connected via a shuttle valve and, during the operation of the pump 42, is constantly subjected to hydraulic pressure irrespective of the pumping direction.

The line 44 is connected to a first (piston-surface-side) operating chamber of the first actuator 12 via a filter and throttle arrangement whereas the line 46 is connected to a first (piston-surface-side) operating chamber of the second actuator 16. A line 50 connected to a second (piston-rod-side) operating chamber of the first actuator 12 is connected via a line 52 to a line 54 which, in turn, is connected to a second (piston-rod-side) operating chamber of the second actuator 16.

The line arrangement 50, 52, 54 has two branches. A line 56, by means of which the line arrangement 50, 52, 54 can optionally be connected to the reservoir 48, namely by means of an electrically activatable directional control valve 58 (activation signal b2), branches off at one point. A line 60, by means of which the line arrangement 50, 52, 54 can optionally be connected to the pressure line 50, namely by means of an electrically activatable directional control valve 62 (activation signal b3), branches off at a second point.

Furthermore, the hydraulic system comprises an arrangement 64 of three normally closed, manually actuable shut-off valves ("emergency activation valves") which permit a service staff member to connect the lines 56, 44 and 46 to the reservoir 48.

By appropriate activation of the pump 42 and the valve device 58, 62 by means of the activation signals b1, b2 and b3 provided by an electronic control device ECU, the hydraulic system illustrated makes it possible to operate each of the actuators 12, 16 independently of the other and also to operate them synchronously (simultaneously) in a hydraulic coupling provided by the hydraulic passage 50, 52, 54.

The operation of the hydraulic system, illustrated in FIG. 7, for the opening operation, already described above with respect to FIGS. 1 to 6, of the vehicle roof system 10 is described below, in which, in a first phase, only the first actuator 12 is actuated, in a second phase (synchronous displacement phase) both the first actuator 12 and the second actuator 16 are operated, and, in a third phase, only the second actuator 16 is operated. The latter sequence of movement is clarified once again in a flow diagram according to FIG. 8.

The piston positions, apparent in FIG. 7, of the two actuators 12 and 16 correspond to the closed position (cf. FIG. 1) of the convertible top 10. The piston rod of the first actuator 12 is fully retracted and the piston rod of the second actuator 16 is fully extended.

In order then to close the convertible top 10, first of all the pump 42 is switched into a pumping direction in which the line 44 is subjected to hydraulic pressure and the line 46 is connected in an unpressurized manner to the reservoir 48. At the same time, the directional control valve 58 is switched over from its inoperative position, illustrated in FIG. 7, into its operative position via the electronic control device ECU such that the line arrangement 50, 52, 54 is connected to the reservoir 48 via said valve 58. The directional control valve 62 is not activated and is therefore in its inoperative position illustrated in FIG. 7.

In said first displacement phase, only the first actuator 12 is therefore actuated (the piston rod extends). The volume of fluid ejected by the piston-rod-side operating chamber of the first actuator 12 flows via the lines 50, 56 and the valve 58 to the reservoir 48. By contrast, the second actuator 16 is not actuated, since its two operating chambers, which are connected to the lines 46 and 54, are kept in an equally unpressurized state.

By means of a sensor system, such as, for example, displacement travel sensors 66 and 68 directly arranged on the actuators 12 and 16, respectively, signals a1 and a2 which are characteristic of the displacement travels of the actuators 12, 16 and are synonymous with the spatial positions of the components 14, 18, which are moved therewith, of the convertible top system 10 are input into the electronic control device ECU.

When the control device ECU then recognizes on the basis of the sensor system mentioned that a predetermined intermediate position of the first actuator 12 has been reached, a synchronous displacement phase is initiated, in which, for the synchronous movement of the corresponding convertible top system components, the first actuator 12 and the second actuator 16 are coupled via the hydraulic passages 50, 52, 54 in such a manner that the volume of fluid ejected by the first actuator 12 is supplied fully to the piston-rod-side operating chamber of the second actuator 16 and the volume of fluid accordingly ejected by the piston-surface-side operating chamber of the second actuator 16 is returned to the reservoir 48. For this purpose, the control device ECU brings about a transfer of the directional control valve 58 into its inoperative position. The hydraulic passage 50, 52, 54 is then no longer connected to the reservoir 48 and brings about the abovementioned hydraulic coupling of the two actuators for the simultaneous actuation.

The synchronous displacement phase is ended as soon as the control device ECU establishes on the basis of the sensor system that the first actuator 12 has reached a second predetermined position. In the exemplary embodiment described, said second predetermined position corresponds to the end position of the actuator 12, in which the piston rod thereof is fully extended. When this is the case, the control device transfers the directional control valve 62 into its operating position such that pressurized hydraulic fluid flows via the line 50, the valve 62 and the lines 60, 54 into the piston-rod-side operating chamber of the second actuator 16. The corresponding volume of fluid ejected by the piston-surface-side operating chamber of the second actuator 16 flows to the reservoir 48 via the line 46. By contrast, the first actuator 12 is not displaced because the two lines 44, 50 which are connected thereto are equally under hydraulic pressure.

This third phase, in which only the second actuator 16 is still operated, is ended by the control device ECU as soon as it is established on the basis of the sensor system that the piston rod of the second actuator 16 has reached a predetermined position (here: the fully retracted position). At the end of said third phase, the convertible top is opened (cf. FIG. 6).

FIG. 9 once again illustrates the time profile of actuator strokes s1 (of the first actuator 12) and s2 (of the second actuator 16) during the opening operation of the convertible top.

At a time t0, the first actuator 12 is in the fully retracted state and the second actuator 16 is in the fully extended state.

Only the first actuator 16 is then extended until the stroke s1 thereof reaches a predetermined intermediate position s1th1 at a time t1. The synchronous displacement phase then begins in a period of time Ts which reaches from the time t1 to a time t2. In said second phase Ts, the first actuator 12 is further extended and at the same time the second actuator 16 is retracted (by means of the hydraulic coupling). During the phase Ts, the ratio of the stroke velocities ds1/d2 and ds2/d2 is constant and is predetermined merely by means of the structure and configuration (orientation) of the two actuators 12, 16. A stroke velocity of the second actuator 16 that is smaller in amount than the stroke velocity of the first actuator 12 is illustrated in FIG. 9 merely by way of example. In practice, the ratio of said stroke velocities can be matched in a simple manner to the individual case by corresponding dimensioning of the actuators.

The end of the synchronous displacement phase Ts (time t2) is reached when the stroke s1 of the first actuator 12 reaches a further predetermined position s1th2. Only the second actuator 16 is then still retracted further until it finally reaches its fully retracted state at a time t3.

The control device ECU continuously monitors the synchronous movement of the components 14, 18, which are driven by the two actuators 12, 16, during the synchronous displacement phase Ts on the basis of signals a1 and a2 input by the sensor system and, if appropriate, detects a deviation of the synchronous movement from a desired synchronous movement predetermined in the control device ECU.

FIG. 10 illustrates the predetermined desired synchronous movement for the example of FIG. 9 and the desired (ideal) coordination of the actuator strokes s1 and s2 during the synchronous displacement phase Ts. In this figure, a desired stroke S2 of the second actuator 16 is plotted as a function of an actual stroke s1 (measured by the sensor system) of the first actuator 12. This dependency between s2 and s1 is stored in the form of a "value window", which is dependent on s1, in a look-up table of the control device ECU which is operated with program control. In this case, the value window constitutes a tolerance range which is delimited by a lower and an upper tolerance threshold (shown by dashed lines in FIG. 10).

During the synchronous displacement, the control device ECU compares the stroke s2 of the second actuator 16, which stroke is detected by the sensor system 66, 68, periodically (e.g. in time intervals of less than one second) with the desired stroke S2 which is assigned on the basis of the stroke s1 detected from the look-up table. Should said comparison reveal that the actual stroke s2 lies within the tolerance range predetermined for the current value of s1, the synchronous displacement is continued without change. However, if it is established that the actual stroke s2 leaves the tolerance range (upward or downward), then a control program running in the control device ECU brings about a correction of the synchronous movement by at least partially suspending the hydraulic coupling of the two actuators 12 and 16 in such a manner that said correction acts in the direction of the desired coordination of the actuator strokes s1 and s2. Deviations in the desired displacement characteristic, which deviations are caused by component tolerances and/or operating errors, such as, for example, hydraulic leakages, from a specified value can therefore easily be compensated for. Such corrections can advantageously be brought about by means of the hydraulic system illustrated in FIG. 7 without additional hydraulic components being necessary for this.

If, for example during the synchronous displacement phase Ts, it is established that the second actuator 16 "lags behind" in a no longer acceptable manner, this can be corrected, for example, by briefly transferring the valve 62 to its operating position. The operation of the first actuator 12 is therefore namely braked or briefly stopped and the operation of the second actuator 16 is continued. Should the second actuator 16 continue to excessively lag behind at the next checking time, then the correction procedure explained above can be repeated.

If the second actuator 16 "hurries ahead" during the synchronous displacement phase Ts, this can be corrected in a similar manner, for example by briefly transferring the valve 58 into its operating position. The displacement movement of the first actuator 12 is therefore essentially not affected (or is even slightly accelerated) and the displacement movement of the second actuator 16 is braked or briefly stopped.

In each case, the correction takes place by means of an at least partial suspension of the hydraulic coupling of the two actuators via the hydraulic passage 50, 52, 54 which, during normal synchronous operation, constitutes a hydraulic line running in a closed manner between the two actuators 12, 16 and in which hydraulic fluid is supplied or removed for correction purposes (depending on the desired correction direction).

As is apparent from FIG. 10, a width D of the tolerance range varies as a function of the detected stroke s1. Said measure leads to a correction functionality which particularly meets requirements. Account is therefore advantageously taken of the fact that most openable vehicle roof systems have one or more phases in which the risk of components colliding is particularly great.

In an advantageous development of the embodiment described, it is provided that the duration of the transfer, which is provided for correction, of the valve 62 or of the valve 58 is selected by the control device ECU as a function of the extent of the deviation between the actual value s2 and the desired value S2 of the actuator stroke.

In another embodiment, it is provided that continuous correction takes place by means of proportional valves which, for example, are switched in parallel to the valves 58 and 62 shown in FIG. 7 or replace said valves 58, 62. With such a proportional hydraulic system, even a substantially continuous adjustment of the synchronous movement to the desired movement can then be realized.

With the hydraulic system which is based on a directional control valve and is illustrated in FIG. 7, a correction process can also be realized during the synchronous displacement phase in which a transfer of the valve 58 or 62, which transfer is brought about to correct the lagging behind or hurrying ahead of the second actuator 16, is maintained until the actual actuator stroke s2 is again acceptable (i.e. lies within the tolerance range).

With the directional control valve device 58, 62 illustrated, a "proportional characteristic" can be approximated by a clocked activation during the correction with a variable pulse length and/or variable pulse interval. For example, the control device ECU can generate pulses with a pulse-duty factor which is dependent on the extent of the desired correction.

The above-described actuation of a vehicle roof system makes it possible, even in the event of comparatively large component tolerances and/or operating malfunctions, to rapidly displace the vehicle roof system with collisions being reliably avoided.

The invention claimed is:

1. A device for actuating a vehicle roof system, comprising a first hydraulic actuator for moving a first component of the vehicle roof system, and a second hydraulic actuator for moving a second component of the vehicle roof system in order to displace the vehicle roof system between a closed position covering the vehicle interior and an open position opening up the vehicle interior, wherein the device is designed so as, during the displacement for opening and/or closing the vehicle roof system, to provide a synchronous displacement phase in which, for the synchronous movement of the two components, the first actuator and the second actuator are hydraulically coupled via a hydraulic passage connecting the two actuators, characterized in that the device comprises:
   monitoring means for monitoring the synchronous movement of the two components during the synchronous displacement phase and for detecting a deviation of the synchronous movement from a predetermined desired synchronous movement,
   correcting means for correcting the synchronous movement by at least partially suspending the hydraulic coupling of the two actuators in the event of a deviation of the synchronous movement from the predetermined desired synchronous movement being detected; and
   wherein the monitoring means compare an actual movement parameter of the second component with a desired movement parameter of the second component, which desired movement parameter is generated on the basis of an actual movement parameter of the first component, and activate the correcting means as soon as the difference between the actual movement parameter and the desired movement parameter of the second component leaves a predetermined tolerance range.

2. The device of claim 1, wherein a width of the tolerance range varies over the synchronous movement range of the displacement.

3. The device of claim 1, wherein the monitoring means comprise a look-up table which is stored in electronic form and assigns a desired movement parameter of the second component to an actual movement parameter of the first component.

4. The device of claim 1, comprising a pump with a delivery connection and a suction connection connected to a reservoir for hydraulic fluid, wherein the hydraulic passage is designed as a hydraulic line arrangement which can be connected either to the delivery connection of the pump or to the reservoir via an activatable valve device for the at least partial suspension of the hydraulic coupling.

5. The device of claim 4, wherein the valve device comprises at least one proportional valve.

* * * * *